(12) United States Patent
Thompson et al.

(10) Patent No.: US 6,912,832 B1
(45) Date of Patent: Jul. 5, 2005

(54) MOWER SUSPENSION

(75) Inventors: Kent L. Thompson, Otley, IA (US); Rustin V. Bentzinger, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 10/869,279

(22) Filed: Jun. 16, 2004

(51) Int. Cl.[7] .................. A01D 34/03; A01D 34/43; A01D 34/64
(52) U.S. Cl. ........................ 56/14.7; 172/669
(58) Field of Search .................... 280/112.1, 111, 280/689; 180/349, 378; 172/669, 779.5, 172/507; 56/14.7, 15.8, DIG. 10

(56) References Cited

U.S. PATENT DOCUMENTS

| | | | | |
|---|---|---|---|---|
| 2,710,519 A | * | 6/1955 | Winter | 56/377 |
| 3,722,191 A | * | 3/1973 | Braunberger | 56/189 |
| 3,754,383 A | * | 8/1973 | Burrough et al. | 56/14.4 |
| 3,957,123 A | * | 5/1976 | Federspiel | 172/481 |
| 4,869,056 A | * | 9/1989 | Lynch | 56/15.2 |
| 5,234,060 A | * | 8/1993 | Carter | 172/413 |
| 5,623,996 A | * | 4/1997 | Postema | 172/118 |
| 5,960,614 A | | 10/1999 | Jones | |
| 5,960,620 A | * | 10/1999 | Wright et al. | 56/377 |
| 2002/0026778 A1 | * | 3/2002 | Koorn | 56/202 |
| 2002/0056556 A1 | * | 5/2002 | Guiet | 172/669 |
| 2003/0140610 A1 | | 7/2003 | Bokyo | |

FOREIGN PATENT DOCUMENTS

EP 566033 A1 * 10/1993 .......... A01D 34/66

* cited by examiner

Primary Examiner—Árpád Fábián Kovács
(74) Attorney, Agent, or Firm—Sturm & Fix LLP

(57) ABSTRACT

A suspension system for a tractor-drawn mower used for crops for agricultural purposes is made up of parallel links, connected at a first end to a frame and to a mowing unit at a second end. A torsion spring assembly, similar to that used for torsion axles, is used to bear a portion of the weight of the mowing unit when the mowing unit is in a lower, mowing position. All torsional stress is removed from the torsion spring when the mowing unit is in a transport position. During mowing, the weight of the mowing unit is divided up between the torsion spring and the surface of the ground. The ratio of the weight supported by the ground to that supported by the torsion spring is adjustable by an operator.

6 Claims, 8 Drawing Sheets

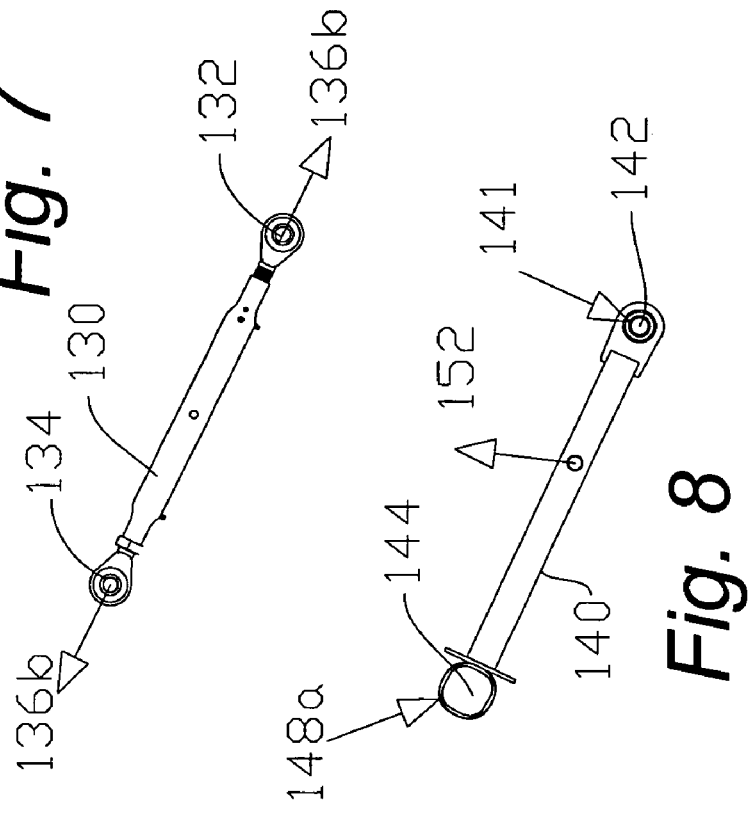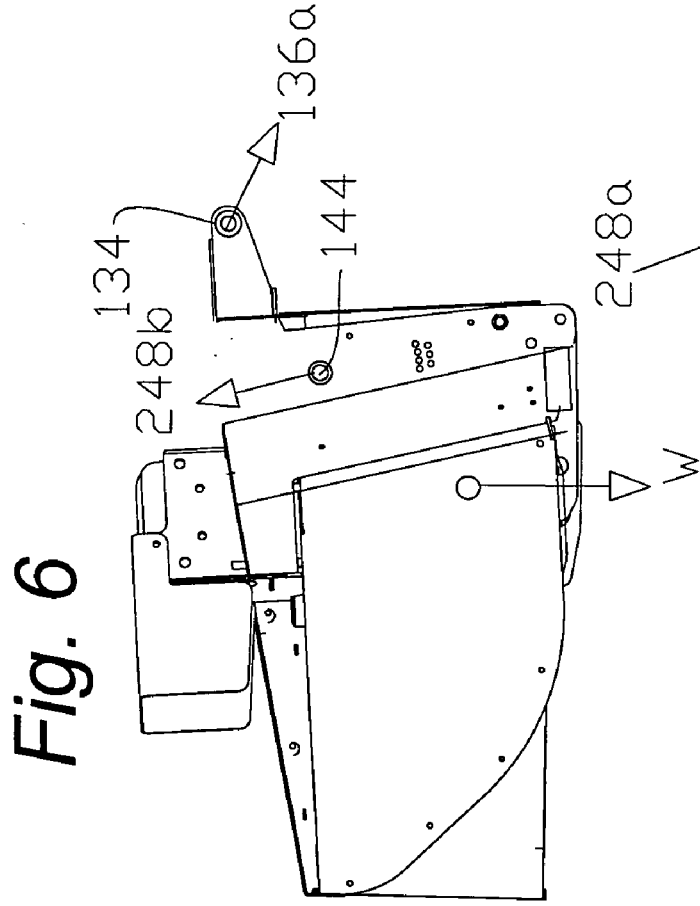

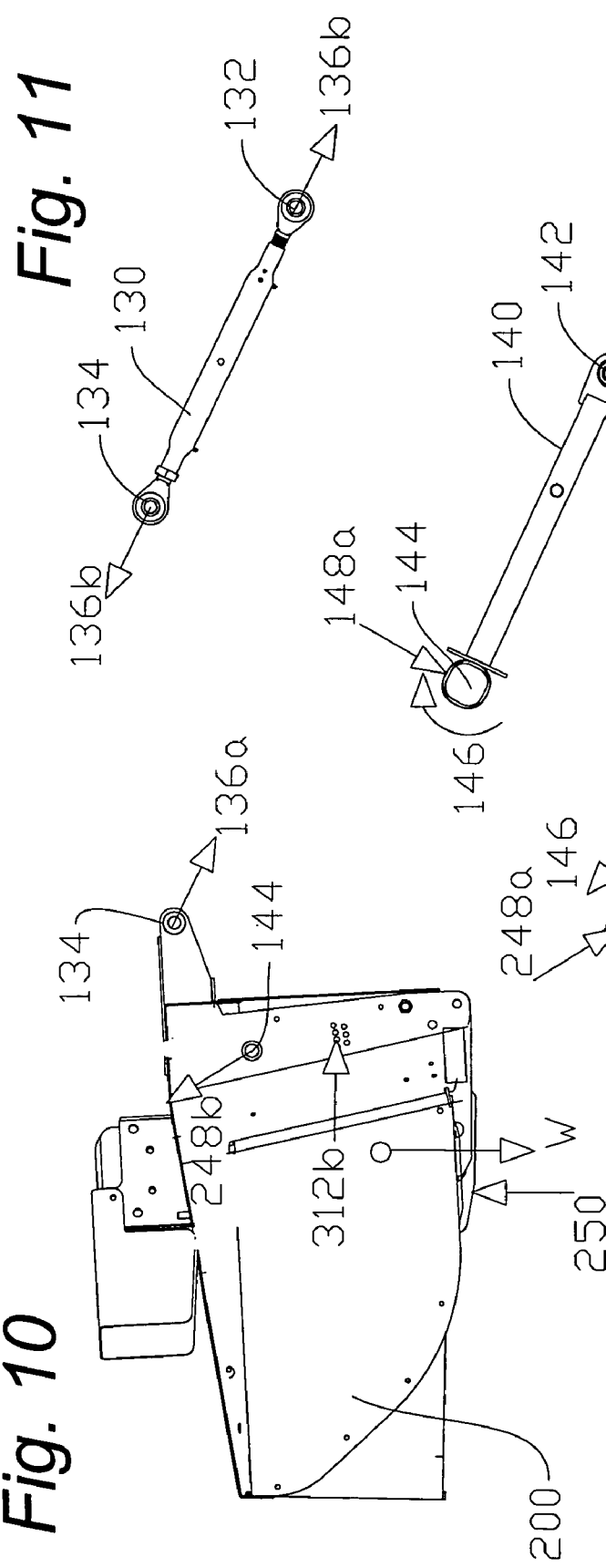

MOWER SUSPENSION

TECHNICAL FIELD

The principles disclosed relate to the suspension for an agricultural mower. More particularly, this disclosure relates to the construction of a mower in a manner that provides a simple and cost effective product that provides adequate suspension.

BACKGROUND

Towed agricultural mowers typically comprise a mowing unit that is supported by a frame, typically in a manner that there are two basic positions. The first is a transport position wherein the mowing unit is in fixed position with the frame supporting its full weight. The second is the lowered operating position wherein it is able to float, move relative to the frame, with a portion of its weight carried by a suspension system to the frame (ultimately through the wheels to the ground). The remaining portion of the weight is transferred directly to the ground via a skid or sliding member. The weight, or force transferred directly to the ground via the skid is hereinafter referred to as ground pressure. The amount of ground pressure will affect the performance of the mower. Many designs provide an operator-adjustable suspension system. Suspension systems are designed to suspend a specific range of weight. The weight range corresponds to a large percentage of the weight of the mowing unit. In this way, the desired ground pressure is provided in order to minimize damage that the skid on the mowing unit may cause to the ground in comparison to allowing the full weight to act against the ground (that is, with no weight being carried on the frame and wheels).

The most common mowing units include a cutting apparatus, a crop conditioning apparatus and the drive train necessary to transfer power to both; the total weight can be significant. Thus, the suspension systems require the use of elements with correspondingly significant load bearing capacity, typically relatively large extension springs. Other suspension systems utilize other types of springs, including rubber torsion springs as disclosed in U.S. Patent Applications publication number 2003/0140610 to Boyko wherein a towed rotary mower uses rubber torsion elements mounted onto the frame, the rubber torsion elements supporting crank arms to support wheels and suspend the frame and mowing unit. U.S. Pat. No. 5,960,614 to Jones discloses a suspension for a mower that is mounted to a tractor with a frame that moves up and down to control the height of the mower, and a suspension element comprising a rubber torsion axle, used to urge one of two parallel linkages in a direction to support a mower unit attached to the frame with a four bar linkage. Neither of these configurations provides an operator control of the ground pressure.

A need thus exists for an improved suspension system for a mower that provides operator adjustment of ground pressure and that is adapted to optimize the mounting onto a trailed frame.

SUMMARY

The mower unit of an agricultural crop mowing machine may be suspended from a frame. The frame is supported by wheels engaging the ground. An object of the present invention is to provide a linkage assembly that permits the mowing machine to be raised into a transport position and lowered into an operating position.

A set of parallel links may be used to attach the mowing machine to the frame. The parallel links, along with a housing on the mowing machine to which the links are attached, and the frame, comprise a parallelogram regardless of the position of the mowing machine. Therefore, the mowing machine does not rotate relative to its frame when its position is altered relative to the frame.

Usually, the mowing machine is partially supported by skids, wheels or the like when it is in its operating position. Another object of the present invention is to provide for varying the fraction of the mowing machine's weight that is supported on these supports. To accomplish this object, two link arms making up a portion of the linkage assembly mentioned above comprise torsion springs such as torsion axles used on trailers. One end of the axle of such a torsion spring is pivotally attached to the mowing machine. The other end of the torsion spring is rigidly attached to a link arm that is, in turn, flexibly attached to the frame. When the mowing machine is in its upper, transport position, no torque is transferred to the torsion spring as the axle is free to pivot relative to the mowing machine. As the mowing machine is lowered to its operating position, the rotation of the axle is stopped relative to the mowing machine by a torque arm and torque is applied to the torsion spring such that some of the mowing machine's weight is supported by the torsion spring. By adjusting the location at which the axle's rotation is stopped relative to the mowing machine, the amount of weight supported by the torsion spring is adjustable.

The torque arm has an aperture shaped to engage an end of the axle of the torsion spring. It may be turned and/or reversed by an operator relative to the axle and reengaged on the end of the axle to adjust the weight borne by the torsion spring when the mowing machine is in its operating position.

The torque arm engages a stop pin that is affixed to the mowing machine. Further adjustment to the weight borne by the torsion spring when the mowing machine is in its operating position may be effected by relocating the stop pin in angular position relative to the axis of rotation of the torsion spring.

In another embodiment of the present invention, the torsion spring may be pivotally attached to the frame and the link arm attached to the mowing machine.

Other objects, advantages and novel features of the present invention will become apparent from the following detailed description of the invention when considered in conjunction with the accompanying drawings.

BRIEF DESCRIPTION OF THE DRAWINGS

FIG. 4a is an isometric view of the lower link assembled from a second, or opposite side;

FIG. 6 is a free body diagram of the mowing unit raised in a transport position;

FIG. 7 is a free body diagram of the upper suspension link of the present invention raised in a transport position;

FIG. 8 is a free body diagram of the lower suspension link of the present invention raised in a transport position;

FIG. 9 is a free body diagram of the rubber torsion spring axle of the present invention raised in a transport position;

FIG. 10 is a free body diagram of the mowing unit lowered to an operating position;

FIG. 11 is a free body diagram of the upper suspension link of the present invention lowered to an operating position;

FIG. 12 is a free body diagram of the lower suspension link of the present invention lowered to an operating position;

FIG. 13 is a free body diagram of the rubber torsion spring axle of the present invention lowered to an operating position.

DETAILED DESCRIPTION

Figure 1:
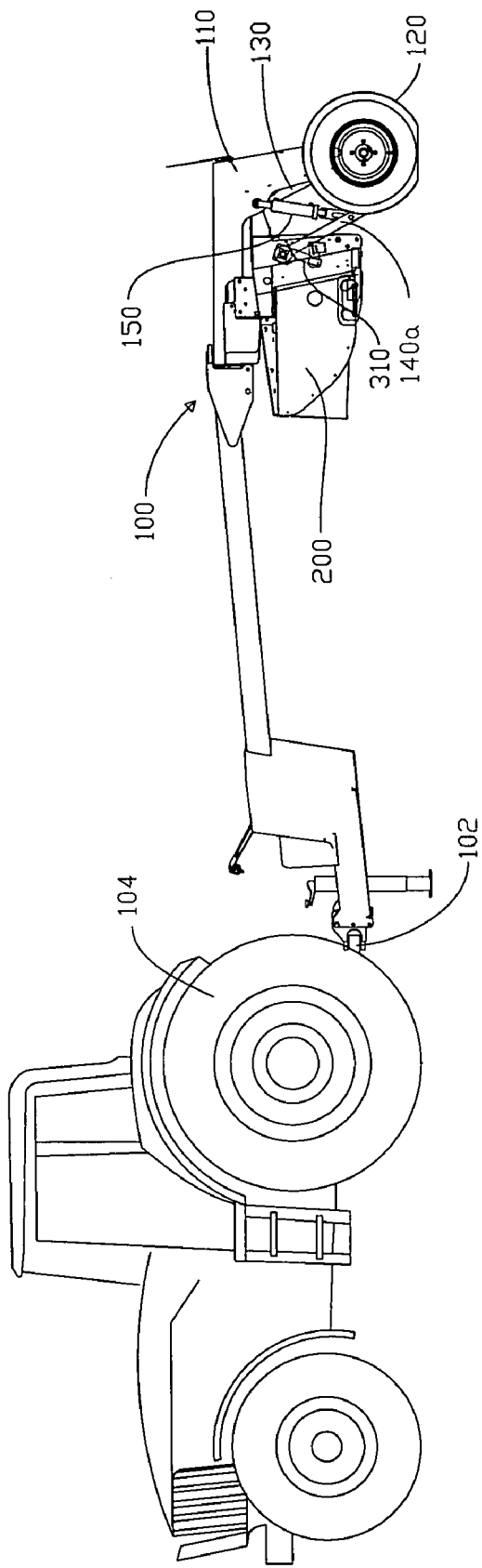
FIG. 1 is a side elevation view of a trailed frame supporting a mowing unit of the present invention with the mowing unit in the raised transport position.

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed.

FIG. 1 illustrates a trailed mower 100 that is comprised of a frame 110 supported at the rear on two tires 120, only one is illustrated as this is a side view, and at the front by a hitch 102 of a tractor 104. The position of the wheels 120 is fixed in relation to the frame 110 such that the height of the frame 110 from the ground is fixed. In this figure, a mowing unit 200 is in a raised transport position, with a front side, closest to the front of the frame, configured to accept crop material, and a rear side configured to eject crop material. The mowing unit 200 is mounted to the frame 110 by a linkage including parallel links. The parallel links include two bottom links 140a, 140b. The left link 140a is shown, while the right link 140b is not shown. Further, the parallel links include a single top link 130, located between the two bottom links 140a, 140b.

Figure 2:
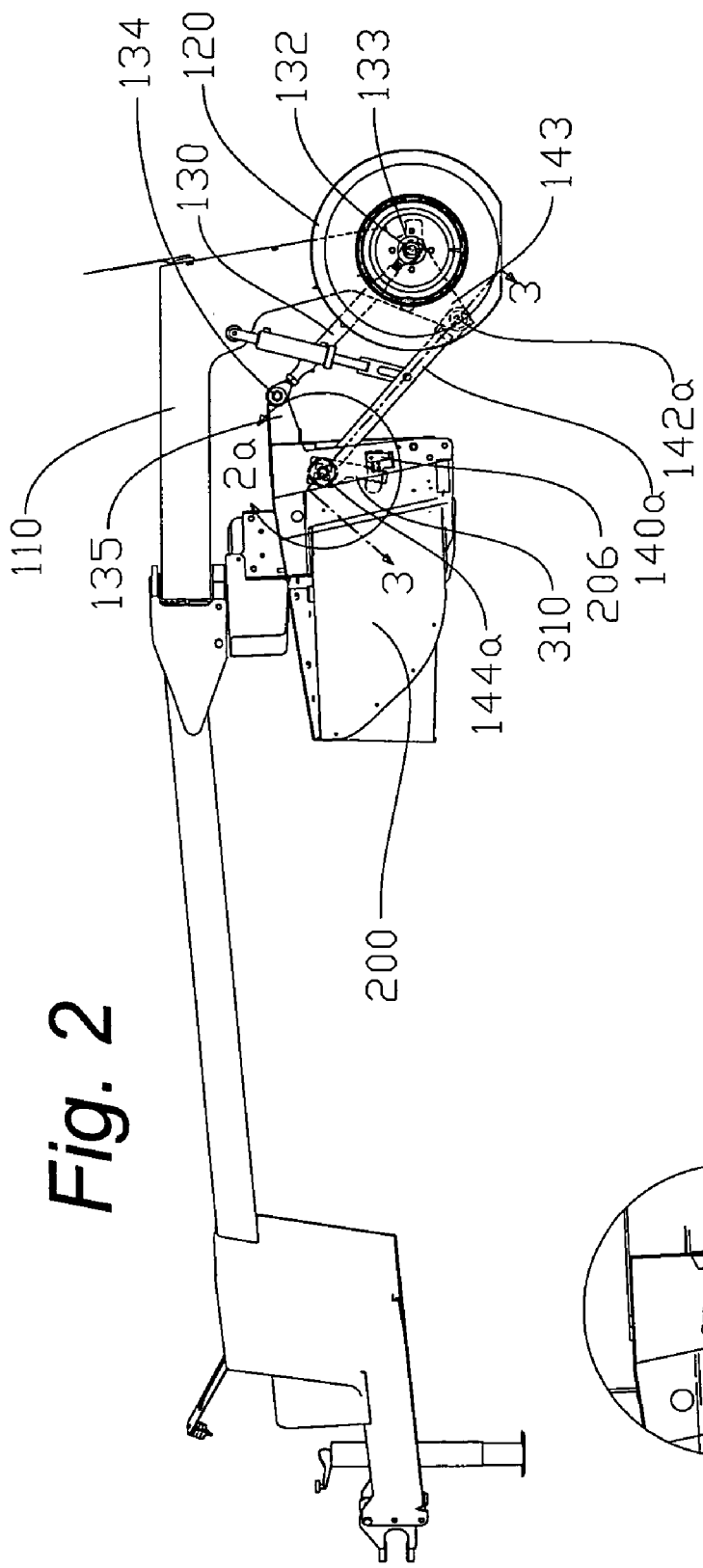
FIG. 2 is a side elevation view of a trailed frame supporting a mowing unit of the present invention with the mowing unit in a partially lowered position.

In FIG. 2 this linkage is illustrated in a partially lowered position wherein the top link 130 is connecting the mowing unit 200 to the frame 110. The single top link 130 is attached to the frame 110 at a top link frame pivot support 133, which is illustrated as approximately concentric with the center of the wheels 120. This pivot support 133 can be located in other positions, its position relative to the wheels is not critical, and the present invention is not limited to any particular location for the pivot support 133. The single top link 130 is attached to the mowing unit 200 at a top link pivot 134 by a top link ear 135.

Figure 14:
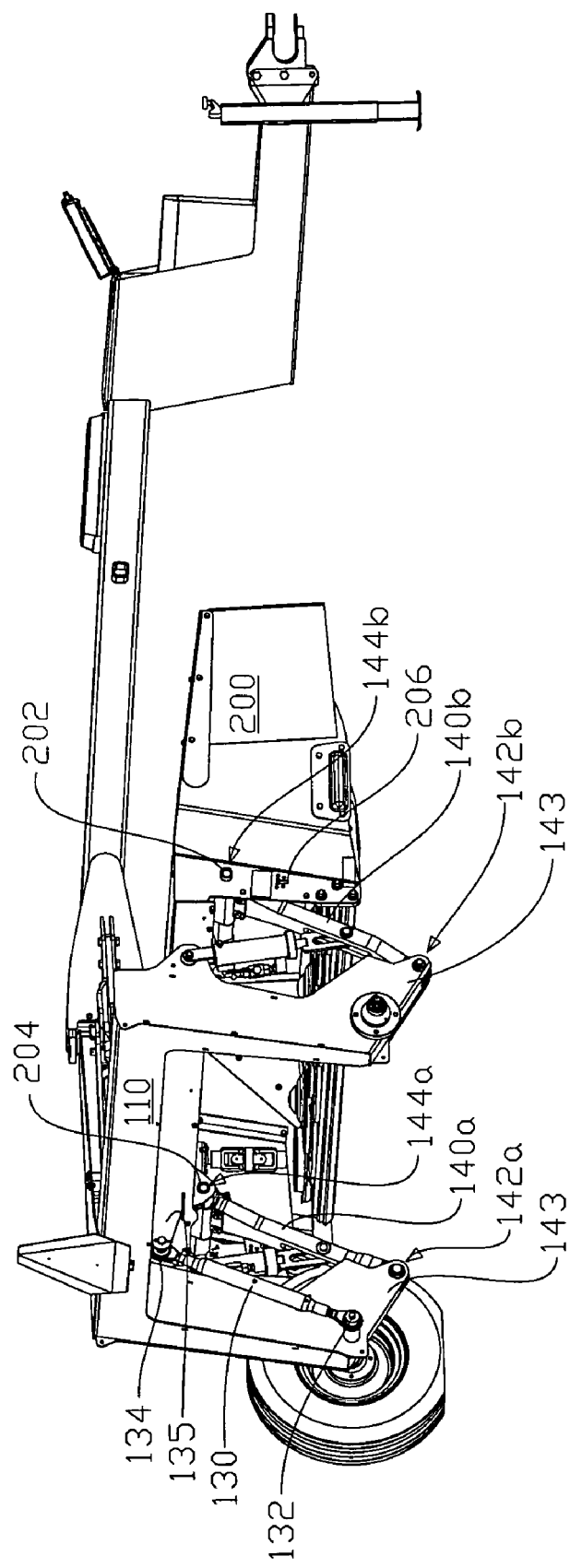
FIG. 14 is an isometric view of the overall machine from the rear right side with the right side wheel removed.

FIG. 14 illustrates the linkage, showing both bottom links 140a, 140b attached to the frame 110 at two frame pivots 142a, 142b, configured with pivot supports 143, on each end of the frame 110. The pivot supports 143 of frame 110 include apertures that align to define a pivot axis.

The bottom links 140a, 140b both attach on the opposite end to the mowing unit 200 at two mower pivots 144a, 144b. The mower pivots 144a, 144b are configured with bearings 202, 204, as will be described below, as components of the mowing unit 200. The mowing unit 200 further includes stops 206 that can be positioned in a variety of positions, as illustrated in FIGS. 2a and 3.

The pivot joints at pivots 132, 134, 142 are basic pivots. Any known type of bearing or bushing could be employed in these pivots, preferably comprising spherical ball joints to provide two degrees of freedom, similar to pivot 142 which includes spherical ball joint 143, illustrated in FIG. 3. The present invention incorporates a novel mower pivot 144 including a rubber torsion axle assembly 301 (see FIG. 4).

Figure 4:
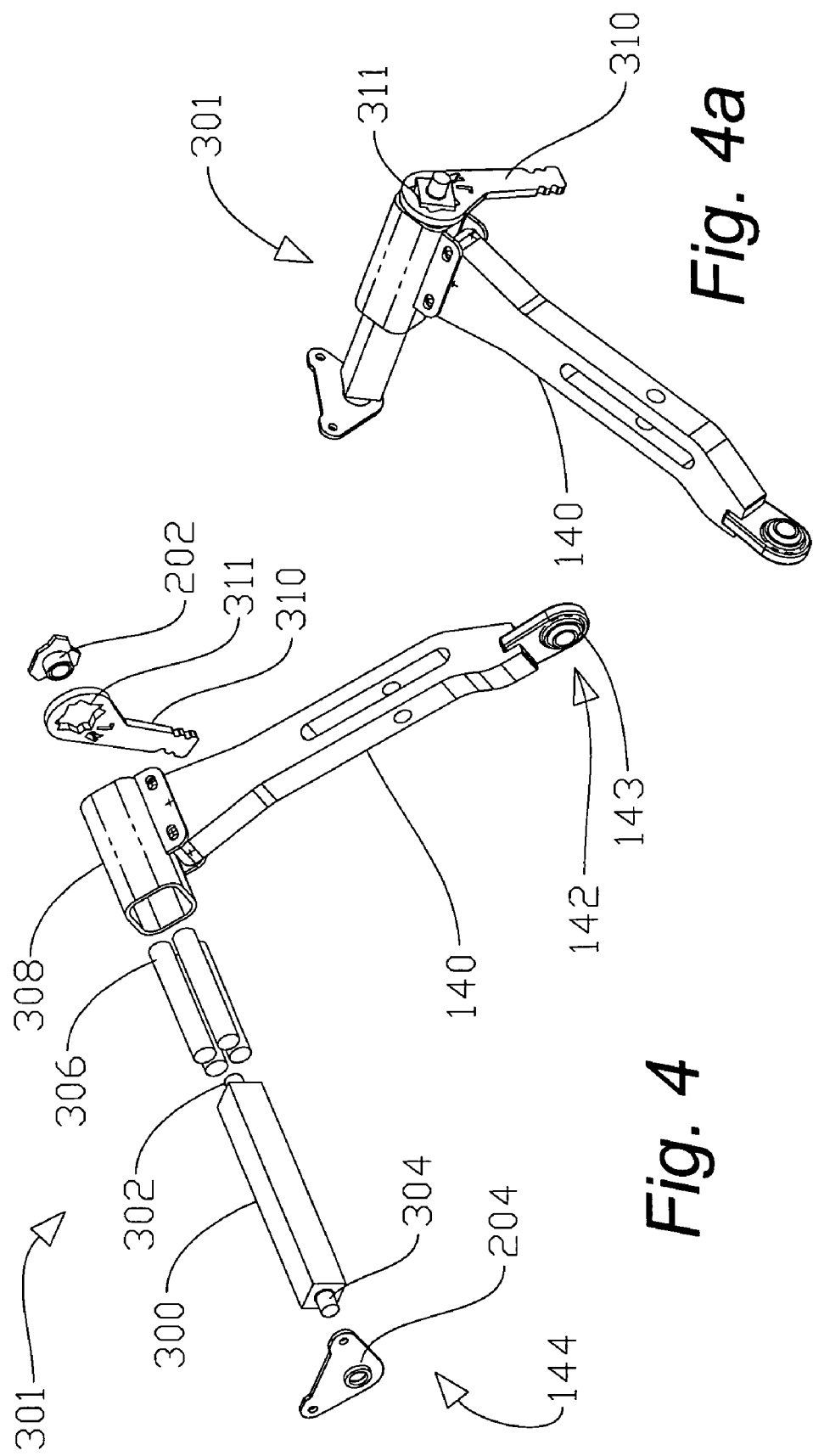
FIG. 4 is an exploded isometric view of one lower link with the torsion spring from a first side.

FIGS. 4 and 4a illustrate the arrangement of the components of the mower pivot 144. The outer square tube portion 308 of a traditional rubber torsion axle assembly 301 is fixedly connected to, and a component of, the lower link 140, in this embodiment configured as a bolted joint. The mower pivot 144 is configured when the axle 300 is installed through the square tube 308, rubber springs 306 are installed in the spaces between the inside surfaces of the square tube 308 and the outer surface of the square shape of the center section of the axle 300. This rubber torsion axle assembly 301 is secured in position as the shaft portion 304 is mounted in the bearing 204, a torque arm 310 is attached to the axle portion 300 of the rubber torsion axle assembly 301 and shaft portion 302 is mounted to bearing 202. The torque arm 310 is rotationally secured to the square portion of the axle portion 300 of the rubber torsion axle assembly 301, by the configuration of aperture 311 which mates with the square tube portion of the rubber torsion axle assembly 301. An aperture 311 is constructed such that the torque arm 310 is reversible, and the same component is used on both sides of the mower.

Figure 2A:
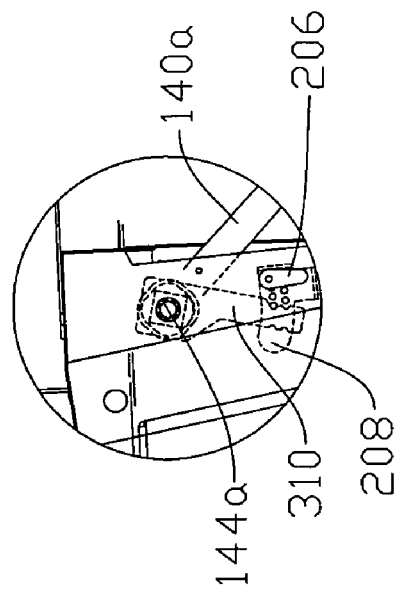
FIG. 2a is a detail of a portion of the side view indicated in circle 2a of FIG. 2.
Figure 3:
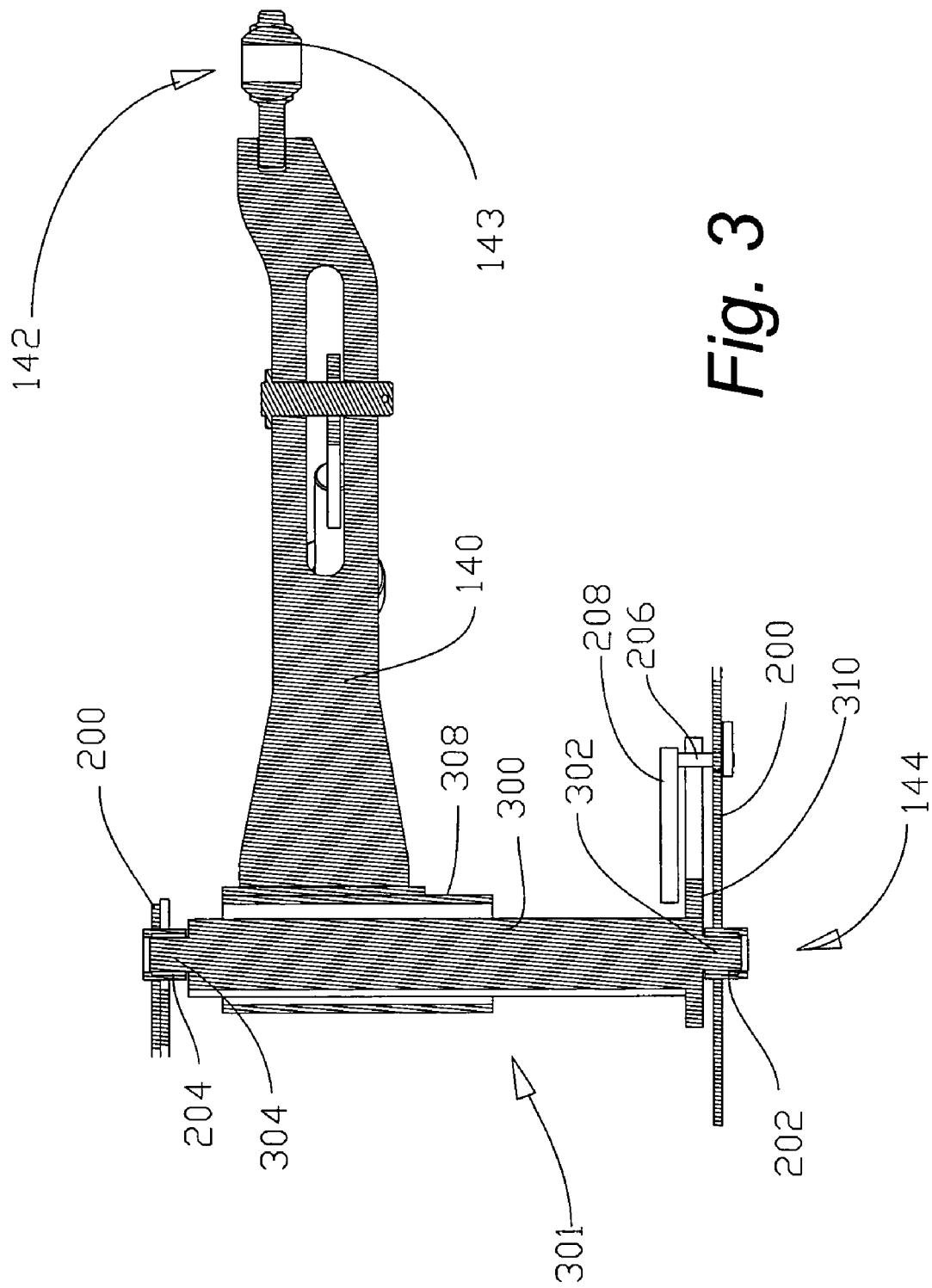
FIG. 3 is a cross-sectional view taken along line 3—3 as illustrated in FIG. 2.

FIG. 3 illustrates the torque arm 310, positioned as shown in FIG. 2a, to come into contact with the stop pin 206 which is supported in the frame 200 and the support plate 208. After the torque arm 310 contacts the stop pin 206, the axle 300 will be restrained from further rotation relative to the frame 200. The mowing unit 200 can be lowered, from the position shown in FIGS. 2 and 2a, towards an operational position illustrated in FIG. 5, by further extending two cylinders 150, only one cylinder 150 shown in FIG. 5. As the mowing unit 200 is thus lowered, the outer tube 308 will rotate counterclockwise, as shown in FIG. 2a, while the axle 300 is held from rotating, causing relative rotation between the outer tube 308 and the axle 300, resulting in a compression load in the rubber springs 306, generating a moment load at the mower pivot 144.

In FIG. 1 the mowing unit 200 is illustrated raised into and held in the transport position by the cylinder 150 that connects to the frame 110 and to the lower link 140. FIG. 8 illustrates a cylinder force 152 acting on one lower link 140, with a resultant force 148a acting at the mower pivot 144. A force 141 acting generally at the pivot 142 is the sum of the two other forces 148a, 152 acting on the lower link 140. This force will result in combined distributed loading on the rubber springs 306. The resulting equal and opposite force 148b is applied to the axle 300 as illustrated in FIG. 9 where an equal and opposite force 248a is applied from the mowing unit 200 through the bearings 202 and 204. The free-body-diagram of FIG. 6 shows force 248b applied to the mowing unit 200. In this way, the lower links 140 transfer force from the cylinder to lift the mowing unit 200 with the rubber torsion axle assembly 301, while the upper link 130 holds the mowing unit 200 from freely rotating, via the force 136b applied at pivot 134. The upper link 130 will be subjected to a tensile load, as illustrated in the free body diagram of FIG. 7.

Figure 5:
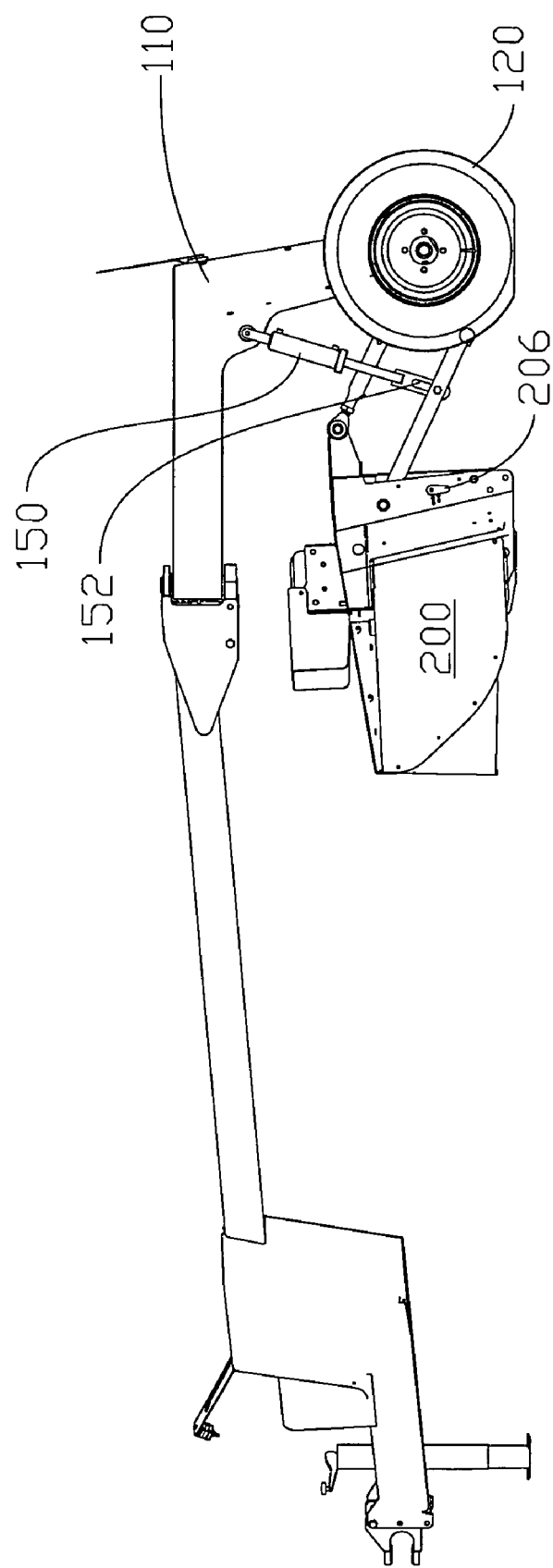
FIG. 5 is a side elevation view of a trailed frame supporting a mowing unit of the present invention with the mowing unit in a lowered operating position.

The cylinders 150 are extended to lower the mowing unit 200 into the operating position illustrated in FIG. 5. As the cylinders 150 extend, and the mowing unit 200 lowers, there will be rotation between both the top link 130 and the bottom links 140a, 140b and their mating components on both the frame 110 and the mowing unit 200. As a result of this rotation the torque arm 310 will move relative to the mowing unit 200 from the position as illustrated in FIG. 1, to the position as illustrated in FIG. 2a with the mowing unit 200 in a partially lowered position. In this position the torque arm 310 will come to a position where it first contacts the stop pin 206. As the cylinders 150 continue to extend, lowering the mowing unit to the position as illustrated in FIG. 5 until there is no load on the bottom links 140a, 140b, as provided by a slot 152 of the cylinder 150. In addition, the lowering action causes rotation of the bottom link 140 relative to the mowing unit 200 which will generate a torque 146 within the axle 300 resulting from the contact of the torque arm 310 with the stop pin 206, and a reaction force 312a. The moment 146 is the result of compression of the rubber springs 306. The equal and opposite force 312b on the mowing machine associated with the reaction force 312a on the torsion axle is shown in FIG. 10.

As illustrated in the free body diagram of FIG. 12, with the cylinders 150 completely extended, there will be no cylinder force, and the moment 146 will be applied to the end of the link 140 by the axle 300, which will simultaneously transmit a force 148a. The force 148a is the result of unequal loading within the rubber springs 306. A force 145 acting generally at the pivot 142 is the resultant due to the force 148a, and the moment 146 acting on the lower link 140. FIG. 13 illustrates the equal and opposite force 148b applied to the rubber torsion axle assembly 301 and torque arm 310, along with the reaction force 312a as applied to the torque arm. The force 248a is applied from the mowing unit. The moment 146 is generated by a reaction force 312a as a function of the relative rotation at the mower pivot 144, which causes compression of the rubber springs 306. FIG. 10 illustrates a force 136a acting at a pivot point 134, to effectively hold the mowing unit 200 from rotation. The upper link 130 will be subjected to an equal and opposite tensile load, as illustrated in the free body diagram of FIG. 11. The net effect of the forces applied to the mowing unit 200 is that the ground contact force 250 will be reduced, as a function of the torque 146.

The torque generated within the rubber torsion axle assembly 301 is a function of the relative rotation between the outer tube 308 and the axle 300. This relative rotation is determined by the position at which the torque arm 310 first contacts the stop pin 206, and the position at which the mowing unit 200 contacts the ground. The pin 206 can be inserted into one of several holes as illustrated. By changing the location of the stop pin 206, the orientation at which the torque arm 310 initially contacts the stop pin 206 is modified. This modification affects the relative rotation the axle 300 is subjected to. Thus, by adjusting the position of the stop pin 206, while the mowing unit 200 is in its raised position, as illustrated in FIG. 1, the amount of torque generated by the axle 300 when the mowing unit 200 is lowered to the operating position, as illustrated in FIG. 5, is controlled. This adjustment allows the operator to adjust the lift force and thus the resulting ground pressure.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

What is claimed is:

1. A mowing machine comprising a front oriented toward a prime mover providing motive power to the mowing machine and a rear oriented away from said prime mover, said mowing machine additionally comprising:
   (a) a frame with a hitch point at the front, a pair of wheels at the rear, first and second ends, each of said first and second ends having a lower frame pivot support, the lower frame pivot supports aligned to define a pivot axis, and an upper frame pivot support located above and between the lower frame pivot supports;
   (b) a header comprising:
      (i) a front side where a crop enters the header, and a rear side where the mowed crop exits the header;
      (ii) a first end having a first lower header pivot support;
      (iii) a second end having a second lower header pivot support;
      (iv) a first lower header pivot bearing at the first lower header pivot support;
      (v) a second lower header pivot bearing at the second lower header pivot support, axes of rotation of the first and second lower header pivot bearings being collinear to define a lower header pivot axis;
      (vi) a first stop structure at the first end, the first stop structure being at a first stop radius about the lower header pivot axis;
      (vii) a second stop structure at the second end, the second stop structure being at a second stop radius about the lower header pivot axis; and
      (viii) an upper header pivot support located above and between the lower header pivot supports;
   (c) a suspension system comprising:
      (i) a first lower link, comprising a first outer torque tube, said outer torque tube extending from the first lower frame pivot support to the first lower header pivot bearing;
      (ii) a second lower link, comprising a second outer torque tube, extending from the second lower frame pivot support to the second lower header pivot bearing;
      (iii) an upper link extending from the upper frame pivot support to the upper header pivot support and generally parallel to the first and second links;
      (iv) a torsion spring axle, with a spring axis, concentric with the outer torque tube of a lower link and concentric with the header pivot bearings; and
      (v) a reaction arm operatively attached to the torsion spring axle with a reaction surface at a distance from the spring axis equal to the stop radius.

2. The mowing machine of claim 1 wherein the suspension system further comprises a hydraulic cylinder operatively connected to the frame and at least one lower link to move the lower link between a transport position and an operating position.

3. The mowing machine of claim 2 where the reaction surface of the reaction arm contacts a stop surface of the header when in the operating position.

4. The mowing machine of claim 3 wherein the reaction surface of the reaction arm of the torsion spring axle does not contact the stop surface of the header when in the transport position.

5. The mowing machine of claim 3 wherein the stop surface can be positioned at a second position.

6. A method of suspending a mowing unit from a frame, the method comprising the steps of:

(a) connecting the mowing unit to the frame with a linkage including links that are connected at mounts on the frame and the mowing unit at pivot joints, wherein there is rotation between the mounts and the links as the mowing unit is moved between a transport position and an operating position by an actuator;

(b) installing a torsion spring, with a torque arm, at a pivot joint of a link such that it is in an unloaded rotational state when the mowing unit is raised to the transport position; and (c) positioning a stop structure at the pivot point containing the torsion spring such that the torque arm contacts the stop structure as the mowing unit is moved to the operating position to generate a torsion load which transfers forces and minimizes a contact force of a header against a ground surface.

* * * * *